United States Patent [19]

Mitchell

[11] Patent Number: 5,030,006
[45] Date of Patent: Jul. 9, 1991

[54] MONOCHROMATOR FOR SINGLE AND MULTIPLEXED DUAL WAVELENGTH SPECTROSCOPY

[75] Inventor: George W. Mitchell, Sidney, Ill.
[73] Assignee: SLM Instruments, Inc., Urbana, Ill.
[21] Appl. No.: 417,234
[22] Filed: Oct. 5, 1989
[51] Int. Cl.$^5$ ............................ G01J 3/427; G01J 3/18
[52] U.S. Cl. ...................................... 356/320; 356/334
[58] Field of Search ............... 356/320, 323, 325, 331, 356/332, 334

[56] References Cited

U.S. PATENT DOCUMENTS

| 3,813,168 | 5/1974 | Honkawa | 356/320 |
| 3,927,944 | 12/1975 | Iwahashi et al. | 356/320 |
| 4,030,829 | 6/1977 | Hoopes | 356/325 |
| 4,664,522 | 5/1987 | LeFebre | 356/334 |

OTHER PUBLICATIONS

"Microcomputer-Controlled Monochromater Acessory Module for Dual Wavelength Spectrochemical Procedure", Defreese et al., Analytical Chemistry, vol. 50, #14, 12/78, pp. 2042–2046.
"Double Beam Monochrometer", Larionov et al., Sov. J. Opt. Tech. 48(8) 8/81, pp. 474–476.
"Programmable Monochromater . . . " Cordos et al., Analytical Chemistry, 42(2), 2/73, pp. 425–443.

Primary Examiner—F. L. Evans
Assistant Examiner—K. P. Hantis
Attorney, Agent, or Firm—McCaleb, Lucas & Brugman

[57] ABSTRACT

A monochromator utilizing a single light source productive of a uniformly intense, single beam, single wavelength coaxial beam output or alternatively, a single beam selected dual wavelength coaxial beam output.

7 Claims, 3 Drawing Sheets

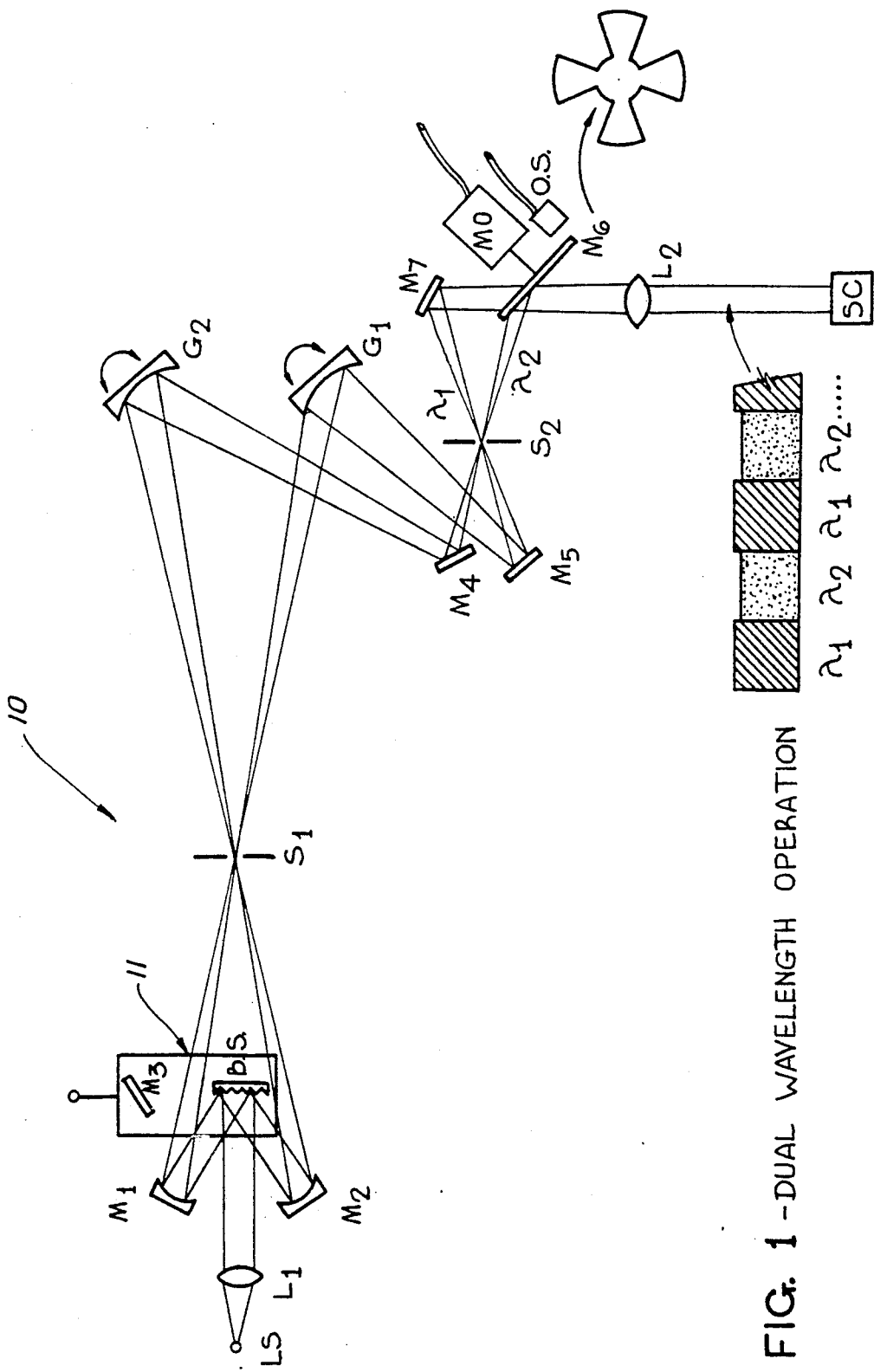
FIG. 1 – DUAL WAVELENGTH OPERATION

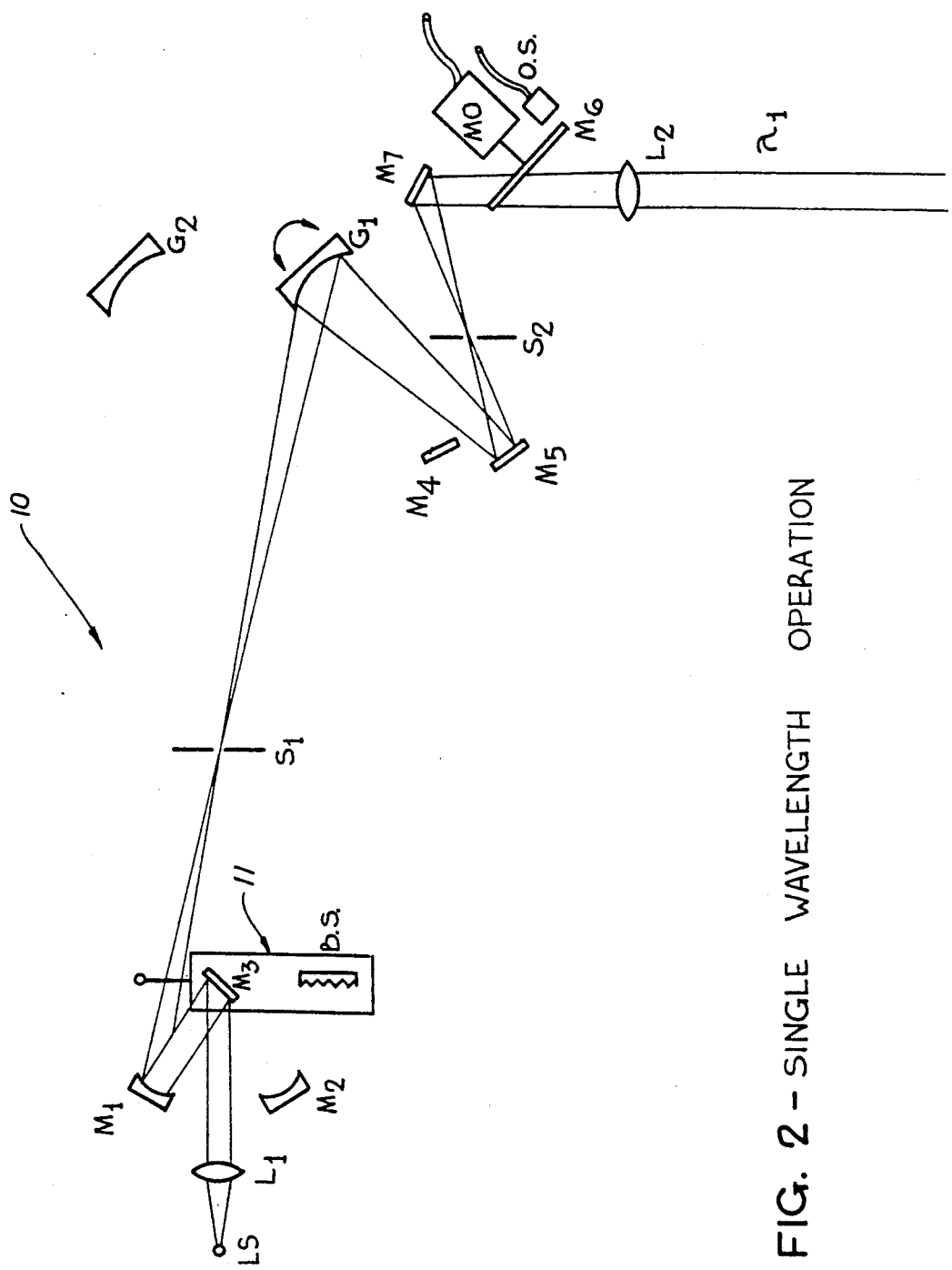
FIG. 2 — SINGLE WAVELENGTH OPERATION

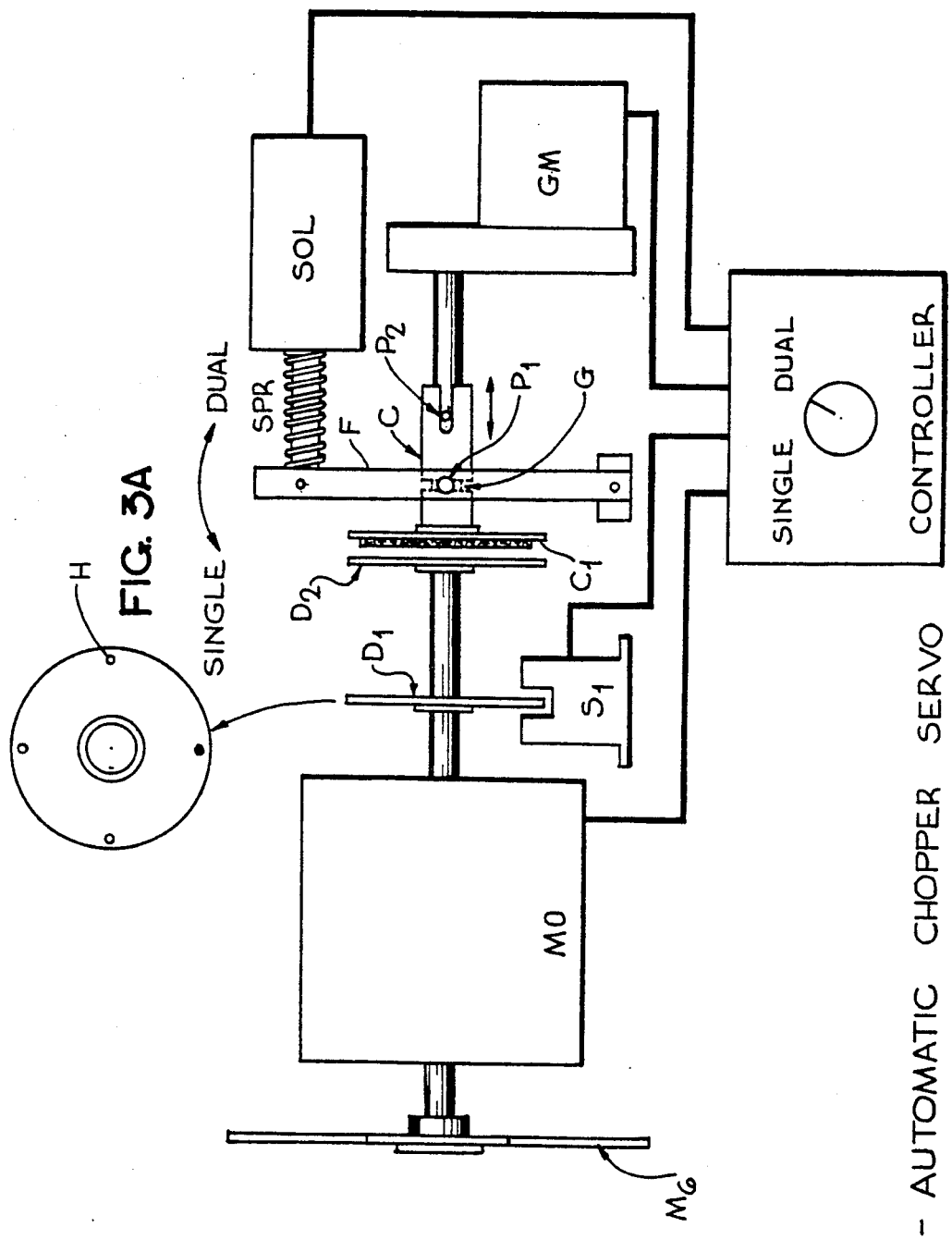
FIG. 3 - AUTOMATIC CHOPPER SERVO

MONOCHROMATOR FOR SINGLE AND MULTIPLEXED DUAL WAVELENGTH SPECTROSCOPY This invention relates generally to optical systems and more particularly to improved monochromators useful with spectrofluorometers or spectrophotometers and like instruments.

The monochromator of this invention employs a single source of white light productive of a single collimated light beam which is selectively convertible to either dual light beams of uniform intensity and selected dual wavelengths or maintained as a single uniformly intense light beam of selected single wavelength. The selected dual wavelength beams are converted by a multiple speed, motor driven servo controlled chopper mirror and collimated to derive a single multiplexed exitation beam. In the single beam, single wavelength operating mode, the motor driven chopper mirror is idled and automatically aligned to permit passage of a single wavelength collimated coaxial output beam.

It is a principal object of this invention to provide a monochromator having a single light source operable in either single beam, dual wavelength or single beam, single wavelength modes.

It is a further object of this invention to provide a monochromator of the character set out in the preceding object which incorporates selectively operable means for producing single coaxial beam output from one non-multiplexed or two multiplexed monochromatic output beams of arbitrary and independently selected wavelengths.

Another important object of this invention is to provide an improved monochromator productive of symmetrical illumination of two wavelength dispersing elements.

Still another important object of this invention is to provide a monochromator having means for high efficiency illumination of one or two wavelength dispersing elements.

A further important object of this invention is to provide an optical system for use with spectrofluorometers and spectrophotometers having means for controlled selection of non-multiplexed or multiplexed arbitrary and independently selected output wavelengths.

Having described this invention, the above and further objects, features and advantages thereof will appear to those of skill in the art from the following detailed description of a preferred embodiment thereof, illustrated in the accompanying drawings, and representative of the best mode presently contemplated for enabling those of skill in the art to practice this invention.

IN THE DRAWINGS

FIG. 1 is a schematic illustration of the monochromator of this invention condition for dual wavelength operation;

FIG. 2 is a schematic illustration of the monochromator of this invention condition for single wavelength operation;

FIG. 3 is a schematic illustration of a servo controlled chopper mirror employed in the monochromator of FIGS. 1 and 2; and FIG. 3A is a schematic front elevation of the chopper disc shown in FIG. 3.

DESCRIPTION OF THE PREFERRED EMBODIMENT

Dual Wavelength Operation

Referring to FIG. 1, the monochromator 10 hereof, shown conditioned for multiplexed dual wavelength operation, comprises a source of white light LS, usually a Xenon lamp, which is collimated by lens $L_1$ and split into two beams of equal intensity by a course grating splitter, BS carried by a suitable shuttle 11 which may be rectilinearly reciprocated either manually or automatically through suitable motor drive means (not shown). The beams emanating from splitter BS are focused by concave, spherical mirrors $M_1$ and $M_2$ onto the entrance of a slit $S_1$. The monochromator employs two dispersing elements $G_1$ and $G_2$ positioned for symmetrical illumination which are concave holographic reflection gratings located at their respective focal lengths away from the common entry slit $S_1$. The gratings $G_1$ and $G_2$ are capable of being rapidly slewed by a motor driven linkage system, not shown herein but of known structure, which preferably is computer controlled to effect a desired angular positioning for the individual gratings $G_1$ and $G_2$. The dispersed wavelengths emanating from the gratings $G_1$ and $G_2$ are redirected by mirrors $M_4$ and $M_5$ which are focused at a common output slit $S_2$. The indicated wavelengths Lambda-1 and Lambda-2 which pass through slit $S_2$ are determined by the independent computer controlled angular positioning of the gratings respective gratings $G_1$ and $G_2$.

A rotatably driven chopper mirror $M_6$ having arcuately spaced blades alternately reflects wavelength Lambda-2 toward a collimating lens $L_2$ which optically communicates with a sample chamber SC. Such reflection of the Lambda-2 wavelengths automatically blocks out the Lambda-1 wavelengths by virtue of the opaque blades of the chopper mirror $M_6$. On the other hand the Lambda-1 wavelengths pass through the collimating lens $L_2$ during the periods when the spacings between chopper blades of $M_6$ are aligned with the reflection from mirror $M_7$.

The speed of rotation of the chopper mirror $M_6$ is determined by an active feed back control of the chopper mirror drive motor MO based on a frequency signal from a reflective-type optical sensor OS which monitors the chopper blades, i.e., optically responds to the presence or absence of the chopper mirror blades. This optical sensor signal is also used to demultiplex the experimental responses of the sample to the Lambda-1 and Lambda-2 wavelengths.

It will be appreciated that with this dual wavelength mode of operation a multiplex signal comprising a mixture of the Lambda-1 and Lambda-2 wavelengths emanates from the collimating lens $L_2$ to impinge the sample in chamber SC in accordance with known practice.

Single Wavelength Operation

With reference now to FIG. 2 of the drawings, it will be recognized that monochromator 10 is therein conditioned for single wavelength operation by virtue of movement of a carriage or shuttle means 11 to position the beam splitter BS out of alignment with the light source and lens $L_1$. In so doing the shuttle 11 automatically positions a plain mirror $M_3$ opposite the light source LS and lens $L_1$. Thus the beam splitter BS has been replaced by the mirror $M_3$ in the single wavelength operating mode illustrated in FIG. 2. In this condition 100% of the input light is directed at grating $G_1$ and only Lambda-1 wavelengths exit from the monochromator. In this respect it will be understood that the wavelength Lambda-1 is selected by the independent computer control of the angular positioning of grating $G_1$. In order to insure positive passage of the Lambda-1 wavelength light from reflective mirror $M_7$ to the collimating lens $L_2$, the chopper motor positions the chopper mirror $M_6$ in an inactive or idle position so that Lambda-1 wavelength light passes unobstructed between the chopper blades to the collimating output lens $L_2$ in a manner which will be described more fully presently.

Thus it will be recognized that in the single wavelength operating mode illustrated in FIG. 2, the monochromator 10 is conditioned to produce a single beam, single wavelength coaxial beam output from the collimating lens $L_2$.

Automatic Chopper Servo

With references now to FIGS. 3 and 3A of the drawings a servo system for automatically controlling the chopper mirror for either dual wavelength or single wavelength operation will now be described.

FIG. 3 schematically sets forth the features of the automatic servo control for chopper $M_6$. As there shown, a controller switch is set for dual wavelength operation whereby power is supplied to a solenoid, SOL, which is pivotally connected to one end of a pivotally mounted shifting fork F having sliding connection with the hub of a clutch C by means of pin $P_1$ which rides in groove G in the clutch hub. Such actuation of the solenoid pulls the clutch plate $C_1$ away from a stopping disc $D_2$ mounted at one end of a chopper motor shaft associated with the chopper motor MO. Power is also supplied to the chopper motor MO in order to rotate the chopper mirror $M_6$ thereby multiplexing the Lambda-1 and Lambda-2 wavelengths as heretofore described.

By switching the controller to single wavelength operation the following sequence ensues. Power is removed simultaneously from the chopper motor and the solenoid whereupon spring SPR pushes the fork F to force clutch C into contact with the stopping disc $D_2$ which halts the rotation of the chopper $M_6$. The clutch is prevented from rotating by virtue of a pin $P_2$ which rides in a slot formed at the outer end of the clutch hub which has a sliding fit on the shaft of gear motor GM; pin $P_2$ passing through the gear motor shaft as shown.

Energization of the gear motor GM is controlled by an optical sensor $S_1$ which senses the presence or absence of one of several holes H in a optical disc $D_1$ mounted on the shaft of the chopper motor M0. When a hole H (see FIG. 3A) in the optical disc $D_1$ is opposite the sensor $S_1$ power to the gear motor GM is interrupted to stop further rotation of the chopper mirror. On the other hand if the optical disc is positioned so that opaque portions intermediate the holes H of the optical disc $D_1$ are sensed by the optical sensor $S_1$, power is supplied to the gear motor GM to rotatably advance the chopper $M_6$. Gear motor GM rotates the clutch/chopper assembly until a hole H in disc $D_1$ is sensed by the optical sensor $S_1$ at which point rotation of the chopper $M_6$ ceases. In this condition the chopper mirror is positioned to pass single wavelength Lambda-1 light in accordance with the above described single wavelength operation as illustrated in FIG. 2 of the drawings.

Any attempt to move the chopper from this arrested position causes the servo to automatically seek the next available open space in the mirror $M_6$ and since the openings H in the chopper disc $D_1$ are spaced to correspond to the open areas in the chopper mirror $M_6$, sensing of the next rotationally indexed hole H opposite sensor $S_1$ again interrupts and arrests the chopper mirror $M_6$ so that Lambda-1 wavelength light passes lens $L_2$.

From the foregoing it is believed that those familiar with the art will readily recognize and appreciate the novel advancement of the present invention over the prior art. Further while this invention has herein above been described in association with a preferred embodiment illustrated in the drawings, it will be understood that various changes, modifications and substitution of equivalents may be made therein without departing from this invention which is intended to be unlimited by the foregoing except as may appear in the following appended claims.

The embodiments of the invention in which an exclusive property or privilege is claimed are defined as follows:

1. In a monochromator, the combination comprising:
   a single source of white light and collimating means productive of a single, collimated, white light beam;
   a pair of selectively positionable wavelength dispersing members, and
   means for selectively illuminating either both of said members symmetrically with said collimated white light or illuminating one of said members with all of said white light beam to produce, respectively, two, uniformly intense monochromatic output light beams or a single uniformly intense, monochromatic output light beams.

2. The combination of claim 1 wherein said dispersing members are individually selectively positionable to effect monochromatic outputs at independent and arbitrary wavelengths.

3. The combination of claim 1, and rotatably driven chopper means posed interferingly in the path of said output light beams and operable to multiplex said two output light beams for collimating and transmission as a single coaxial beam to a remote test sample.

4. The combination of claim 3 wherein said chopper means comprises a rotatable chopper mirror having arcuately spaced mirror blades, and control means for selectively arresting said chopper mirror including means for automatically and positively positioning said chopper mirror for passage of said single output light beam between adjacent said blades for transmission to said test sample.

5. In a monochromator for use with spectrofluorometers or spectrophotometers and like instruments, the combination comprising:
   a single source of white light;
   · means for producing a single collimated light beam from said light;
   a slide mechanism carrying a beam splitter and mirror positionable by said mechanism to respectively split said light beam into a pair of identical, intensity balanced symmetrical beams or, alternatively, reflect all of said light beam;
   a pair of wavelength dispersing members, each arranged for illumination by one of said symmetrical beams created by said beam splitter or, alternately, illumination of only one of said wavelength dispersing members by the light beam reflected from said mirror; each dispersing member being independently productive of a monochromatic output light beam or arbitrary selected wavelength;

means for converting the arbitrary selected wavelength output beams from the symmetrically illuminated dispersing members or, alternatively, the arbitrarily selected wavelength output beam of said one illuminated dispersing member into a single collimated multiplexed beam or a single collimated non-multiplexed beam, respectively, comprising;

chopper means interferingly positioned in the paths of said arbitrary wavelength output beams or beam to effect a single multiplexed or a single non-multiplexed beam, respectively, therefrom for transmission to a test sample.

6. The combination of claim 5 and control means for arrestingly aligning said chopper means in the path of said single non-multiplexed output beam to effect passage thereof to said test sample.

7. The combination of claim 6 wherein said chopper means comprises a multi bladed chopper mirror, and motor means for rotatably driving said mirror; and said control means comprises a solenoid operated clutch operable to arrest said motor means, an optical switch means for determining the aligned position of said chopper mirror, and second motor means for rotatably indexing said chopper mirror to position the same for passage of said non-multiplexed output beam to said test sample.

* * * * *

UNITED STATES PATENT AND TRADEMARK OFFICE
CERTIFICATE OF CORRECTION

PATENT NO. : 5,030,006
DATED : 7/9/91
INVENTOR(S) : George W. Mitchell

It is certified that error appears in the above-identified patent and that said Letters Patent is hereby corrected as shown below:

Col. 4, line 36, delete "beams" and insert -- beam --;

Col. 4, line 44, delete "collimating" and insert -- collimation --;

Col. 5, line 5, delete "or" and insert -- of --.

Signed and Sealed this

First Day of December, 1992

Attest:

DOUGLAS B. COMER

Attesting Officer

Acting Commissioner of Patents and Trademarks